Aug. 21, 1934.  H. F. SHINDEL  1,971,055
LENS MOUNTING
Filed July 5, 1933
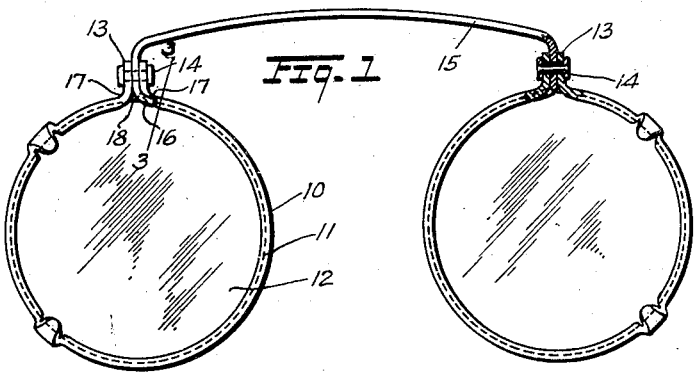
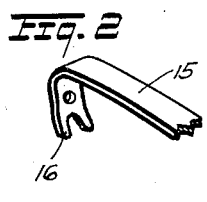
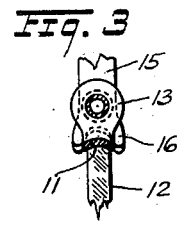
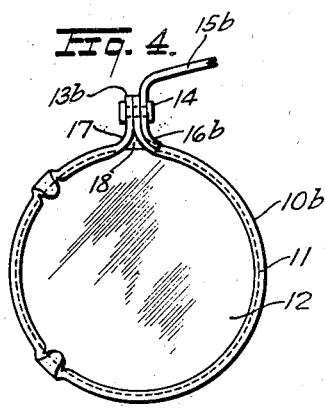
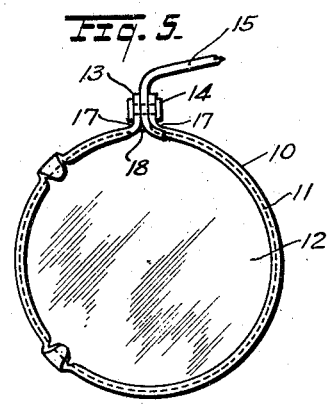
Harry F. Shindel Inventor
By W.G.A. Mscuway
Attorney Patented Aug. 21, 1934

1,971,055

UNITED STATES PATENT OFFICE 1,971,055

LENS MOUNTING

Harry F. Shindel, Reading, Pa., assignor to Willson Products, Inc., Reading, Pa., a corporation of Pennsylvania Application July 5, 1933, Serial No. 679,009

1 Claim. (Cl. 88—47)

This invention relates to eye-glasses or the like and particularly to an improved lens rim and an interlocking connection between the latter and a rim-attached member such as a nose-bridge.

Where a split rim provided with eyelet secured joining lugs or ears is employed to hold a lens and the ear-securing eyelet is also utilized to attach the rim to a mounting member, such as a nose-bridge, it is desirable to prevent pivoting of the rim relatively to the mounting member in order to maintain the lenses in the same plane or in proper relation to the eyes of a wearer without requiring frequent readjustment of these parts. Accordingly, a feature of the present invention resides in the provision of an interlocking connection between a split-rim and its mounting which effectively prevents such undesirable pivoting movement.

In making eye-glasses in quantity production for sale at moderate prices it is impractical to perform expensive grinding operations, or the like, to assure that all glasses are of exactly the same size and the glasses when blanked, cut or formed may vary in diameter. And although such resulting differences in diameter may be relatively slight, difficulties may sometimes arise in fitting various quantity produced glasses into a single size of split lens rim; the smaller glasses fitting too loosely in the rim, and larger glasses sometimes producing a distortion of the rim which may hinder the alinement of the joining ears for clamping the glasses in place. Therefore, another feature of the invention resides in the provision of a split lens rim especially formed to provide a proper holder for glasses which are of various slightly different sizes as a result of quantity production. A further feature resides in forming the lens rim to facilitate the provision of an interlocking connection between a lens rim and its mounting as mentioned above.

These and other features and advantages of the present invention will become apparent upon consideration of the following description and appended claim when read in conjunction with the accompanying drawing.

The invention will be described in connection with a pair of "clip on" sun-glasses of the type adapted to be attached to conventional eye-glasses or spectacles although, as will be readily apparent, it is in no way limited to such an embodiment.

In the drawing:

Figure 1 is a rear view of a pair of eye-glasses embodying the invention, partially in sections to illustrate details of construction;

Figure 2 is a perspective view of one end of the nose bridge and shows its interlocking construction;

Figure 3 is a sectional view on the line 3—3 of Fig. 1;

Figure 4 is a rear view showing the special lens rim of the invention applied to a small sized lens and also illustrates another arrangement for attaching the bridge to lens rim; and Figure 5 is a rear view showing the special lens rim applied to a larger sized lens.

The glasses illustrated include a pair of split rims 10 each formed with a grooved or channeled portion 11 for embracing the perimeter of the respective lens 12 and provided with a pair of joining lugs or ears 13 having apertures for receiving a fastening eyelet, or the like, 14 to join the ends of the rim and thus clamp the lens in place. A pair of rim enclosed lenses are interconnected by a rigid nose bridge 15 which according to the invention is interlockingly engaged with each of the rims 10.

In the form of the invention illustrated in Figs. 1-3 the bridge 15 extends adjacent its ends between the pair of ears on each rim and is provided with suitable apertures through which the ear-fastening eyelets 14 extend for attaching the member 15 to the rims 10. To attain a rigid, interlocking connection with the rims and prevent pivoting of the rims and lenses relatively to the bridging member 15 the ends of the latter are forked or bifurcated, as designated at 16, and arranged to engage the adjacent portions of a rim or lens, or both. As shown in Figures 1 and 2 end portions of the bridge 15 beyond its point of attachment to ears 13 are bent to extend adjacent the curved rims 10 so that the bifurcations engage the rim. To facilitate engagement of the bridge ends with the inner side of the rims and to prevent such distortion of the rims as might result from the thickness of a bridge end lying between the perimeter of the lens and the inner side of the rim and thus render it difficult to align the apertures of the ears for joining the latter, the bifurcations are preferably spread from parallelism with each other so as to be disposed at the sides of the peripheral edges of the lens as shown in Fig. 3.

To provide a lens rim adapted to the interlocking connection between mounting member 15 and lens rim 10, as described above, and also to enable fitting of slightly different sized lens resulting from quantity production into a single size lens rim, the rim 10 is especially formed. The rim 10 is made from a strip of material of sufficient length that the rim portion between the ears 13 may fit around the edge of the larger size glasses without causing misalignment of the apertures of the joining ears 13. The lens embracing channel 11 is terminated at a distance from the ears 13 and the rim portions between the ends of channel 11 and the upstanding ears 13 are curved on a reverse radius as indicated at 17. The rim is formed into an approximate circle of a size to securely retain a smaller sized lens.

When such a lens is mounted in the rim its peripheral edge is embraced by channel 11 except for a small portion which defines the base of a roughly triangular shaped opening 18 resulting from the reversed curvature of the rim portions 17 between the upstanding ears and the ends of channel 11, as shown in Fig. 4. When a larger lens is fitted into the rim the application of eyelet 14 to join the rim ends in drawing the ears 13 together causes the rim to conform to the larger perimeter by diminishing the reversely radiused curves 17 and utilizing portions of the rim material therein to make up for the difference between the larger and the average or smaller sized lenses, as illustrated in Figure 5.

In addition to enabling proper fitting of a lens rim to glasses of different diameter, as described above, the reversely radiused portions 17 adjacent ears 13 also provide for accommodating the bent ends of the bridge 15 without distorting the rim 10 inasmuch as the bifurcated ends 16 become disposed in the triangular space 18.

In Figures 1 and 3 the bifurcated end of the rim attached member 15 has been shown as bent in such manner as to engage the inner side of the rim adjacent the ear 13. If desired the end might be bent so that the bifurcations 16 engage the edge of the lens or with an intermediate curvature the bifurcations might engage both the perimeter of the lens and the rim.

Figure 4 illustrates another arrangement in which the ears 13$^b$ are joined with their inner faces in abutting relation and the mounting member 15$^b$ is attached by eyelet 14 in contact with the outer face of one ear and its bent end extending along the periphery of rim 10$^b$ so that the bifurcations 16$^b$ engage the outer side of the rim to interlock both it and mounting member 15$^b$.

Other changes and variations may be made without departing from the spirit of the invention and it is intended to include all such changes and variations within the scope of the appended claim.

What I claim is:

A spectacle mounting adaptable to lenses of different perimetrical measurements, comprising a pair of lens-rim framings each formed of bendable open-ring eye wire having perforated clamping-ear terminal portions settable at a distance from the framed lens as determined by the perimetrical measurement of the latter, and a bridge member for said framings having opposite perforated end portions adapted to be pivotally secured to the clamping ears of the respective framing, and provided with forked end extensions bent into non-turning engagement with the latter.

HARRY F. SHINDEL.